(12) United States Patent
Choi et al.

(10) Patent No.: US 10,654,025 B2
(45) Date of Patent: May 19, 2020

(54) AMINE-BASED CARBON DIOXIDE ADSORBENT RESISTANT TO OXYGEN AND SULFUR DIOXIDE AND METHOD OF PREPARING THE SAME

(71) Applicant: KOREA ADVANCED INSTITUTE OF SCIENCE AND TECHNOLOGY, Daejeon (KR)

(72) Inventors: Minkee Choi, Daejeon (KR); Woosung Choi, Daejeon (KR); Chaehoon Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/191,527

(22) Filed: Nov. 15, 2018

(65) Prior Publication Data

US 2019/0143299 A1    May 16, 2019

(30) Foreign Application Priority Data

Nov. 15, 2017  (KR) .................. 10-2017-0152380
Dec. 28, 2017  (KR) .................. 10-2017-0182212

(51) Int. Cl.
  *B01J 20/22*  (2006.01)
  *B01J 20/32*  (2006.01)
  (Continued)

(52) U.S. Cl.
  CPC ............ *B01J 20/265* (2013.01); *B01D 53/02* (2013.01); *B01D 53/0462* (2013.01);
  (Continued)

(58) Field of Classification Search
  None
  See application file for complete search history.

(56) References Cited

U.S. PATENT DOCUMENTS

2002/0094566 A1* 7/2002 Tubbs ............... B01J 20/281
                                                    210/198.2
2004/0127357 A1* 7/2004 Simpson ............ B01D 15/3828
                                                    502/401

FOREIGN PATENT DOCUMENTS

JP       2010194509 A    9/2010
JP       2015047581 A    3/2015
(Continued)

OTHER PUBLICATIONS

Sigma-Aldrich Safety Data Sheet for (3-Aminopropyl)trimethoxysilane. Published Oct. 17, 2019; viewed at https://www.sigmaaldrich.com/catalog/product/ALDRICH/281778?lang=en&region=US on Dec. 4, 2019.*

(Continued)

*Primary Examiner* — Daniel Berns
(74) *Attorney, Agent, or Firm* — Hultquist, PLLC; Steven J. Hultquist

(57) ABSTRACT

The core-shell type amine-based carbon dioxide adsorbent including a chelating agent resistant to oxygen and sulfur dioxide according to the present invention is an adsorbent which includes a chelating agent to inhibit oxidative decomposition of amine and has, as a core, a porous support on which an amine compound is immobilized and has, as a shell, an amine layer resistant to inactivity by sulfur dioxide, and a method of preparing the same. The amine-based carbon dioxide adsorbent including a chelating agent exhibits considerably high oxidation resistance because an added chelate compound functions to directly remove a variety of transition metal impurities catalytically acting on amine oxidation. In addition, the sulfur dioxide-resistant amine layer of the shell selectively adsorbs sulfur dioxide to protect the amine compound of the core and, at the same time, the amine compound of the core selectively adsorbs only carbon dioxide. In addition, sulfur dioxide adsorbed on the shell is readily desorbed therefrom at about 110° C. and thus remarkably improved regeneration stability is obtained during the temperature-swing adsorption (TSA) process containing sulfur dioxide.

10 Claims, 5 Drawing Sheets

(4 of 5 Drawing Sheet(s) Filed in Color)

(51) Int. Cl.
- B01J 20/04 (2006.01)
- B01J 20/10 (2006.01)
- B01J 20/26 (2006.01)
- B01J 20/28 (2006.01)
- B01D 53/02 (2006.01)
- B01D 53/04 (2006.01)

(52) U.S. Cl.
CPC .......... B01J 20/048 (2013.01); B01J 20/103 (2013.01); B01J 20/223 (2013.01); B01J 20/28021 (2013.01); B01J 20/28071 (2013.01); B01J 20/28073 (2013.01); B01J 20/28076 (2013.01); B01J 20/3204 (2013.01); B01J 20/328 (2013.01); B01J 20/3236 (2013.01); B01J 20/3265 (2013.01); B01J 20/3289 (2013.01); B01J 20/3293 (2013.01); B01D 2253/102 (2013.01); B01D 2253/106 (2013.01); B01D 2253/108 (2013.01); B01D 2253/202 (2013.01); B01D 2253/204 (2013.01); B01D 2253/25 (2013.01); B01D 2253/311 (2013.01); B01D 2257/302 (2013.01); B01D 2257/504 (2013.01); B01D 2258/0283 (2013.01)

(56) References Cited

FOREIGN PATENT DOCUMENTS

| KR | 20160126693 A | 11/2016 |
| KR | 101696395 B1 | 1/2017 |
| KR | 1020170053041 A | 5/2017 |
| KR | 20170119829 A | 10/2017 |
| KR | 1020170127416 A | 11/2017 |

OTHER PUBLICATIONS

Sigma-Aldrich Certificate of Analysis for Davisil® grade 644 silica gel. Published 2002; viewed at https://www.sigmaaldrich.com/catalog/CertOfAnalysisPage.do?symbol=236829&LotNo=09401JA&brandTest=SIAL on Dec. 4, 2019.*

Maketon, W., et al., "Removal Efficiency and Binding Mechanisms of Copper and Copper-EDTA Complexes Using Polyethyleneimine", "Environmental Science & Technology", 2008, pp. 2124-2129, vol. 42, No. 6, Publisher: American Chemical Society.

Choi, W., et al., "Epoxide-Functionalization of Polyethyleneimine for Synthesis of Stable Carbon Dioxide Adsorbent in Temperature Swing Adsorption", "Nature Communications", 2016, pp. 12640-12647, vol. 7.

Li, W., et al., "Structural Changes of Silica Mesocellular Foam Supported Amine-Functionalized CO2 Adsorbents Upon Exposure to Steam", "Applied Materials and Interfaces", 2010, pp. 3363-3372, vol. 2, No. 11.

Min, K., et al., "Macroprous Silica with Thick Framework for Steam-Stable and High-Performance Poly (ethyleneimine)/Silica CO2 Adsorbent", "ChemSusChem", 2017, pp. 2518-2526, vol. 10.

Pang, S., et al., "Design of Aminopolymer Structure to Enhance Performance and Stability of CO2 Sorbents: Poly (propylenimine) vs Poly(ethylenimine)", "Journal of the Americal Chemical Society", 2017, pp. 3627-3630, vol. 139.

Rezaei, F., et al., "Stability of Supported Amine Adsorbents to SO2 and NOx in Postcombustion CO2 Capture. 1. Single-Component Adsorption", "Industrial and Engineering Chemistry Research", 2013, pp. 12192-12201, vol. 52.

Sayari, A., et al., "CO2 Deactivation of Supported Amines: Does the Nature of Amine Matter", "Langmuir", 2012, pp. 4241-4247, vol. 28.

Srikanth, C.S., et al., "Spectroscopic Investigation into Oxidative Degradation of Silica-Supported Amine Sorbents for CO2 Capture", "ChemSusChem", 2012, pp. 1435-1442.

Srivastava, R.K., et al., "Flue Gas Desulfurization: The State of the Art", "Journal of the Air and Waste Management Association", Dec. 2001, pp. 1676-1688, vol. 51.

Tailor, R., et al., "Supported Polytertiary Amines: Highly Efficient and Selective SO2 Adsorbents", "Environmental Science and Technology", 2014, pp. 2025-2034, vol. 48.

Voice, A.K., et al., "Inhibitors of Monoethanolamine Oxidation in CO2 Capture Process", "Industrial and Engineering Chemistry Research", 2014, pp. 16222-16228, vol. 53.

Xu, X., et al., "Preparation and Characterization of Novel CO2 Molecular Basket Adsorbents Based on Polymer-Modified Mesoporous Molecular Sieve MCM-41", "Microporous and Mesoporous Materials", 2003, pp. 29-45, vol. 62.

Zhang, H., et al., "CO2 Capture on Easily Regenerable Hybrid Adsorbents Based on Polyamines and Mesocellular Silica Foam. Effect of Pore Volume of the Support and Polyamine Molecular Weight", "RSC Advances", 2014, pp. 19403-19417, vol. 4.

* cited by examiner

FIG. 1

| Chelating agent | Structural Formula |
|---|---|
| 1 | Trisodium phosphate (TSP) | 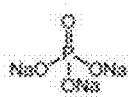 |
| 2 | 1-hydroxyethane 1,1-diphosphonic acid tetrasodium salt (HEDP-Na) |  |
| 3 | Ethylenediamine tetra(methylene phosphonic acid) octasodium salt (EDTMP-Na) | 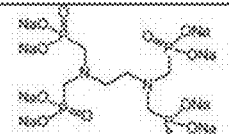 |
| 4 | Ethylenediaminetetraacetic acid tetrasodium salt (EDTA-Na) | 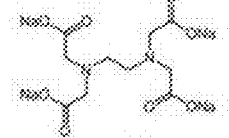 |
| 5 | Diethylenetriaminepentaacetic acid pentasodium salt (DTPA-Na) |  |
| 6 | Dimercaptosuccinic acid disodium salt (DMSA-Na) |  |

| Sample | C/N ratio (by elemental analysis) | C/N ratio (by XPS analysis) |
|---|---|---|
| 10-EB-PEI/SiO$_2$ | 3.3 | 3.2 |
| 10-1-EB-PEI/SiO$_2$ | 3.4 | 3.7 |
| 10-1.5-EB-PEI/SiO$_2$ | 3.4 | 3.8 |
| 10-2-EB-PEI/SiO$_2$ | 3.5 | 4.0 |

AMINE-BASED CARBON DIOXIDE ADSORBENT RESISTANT TO OXYGEN AND SULFUR DIOXIDE AND METHOD OF PREPARING THE SAME

TECHNICAL FIELD

The present invention relates to an amine-based carbon dioxide adsorbent resistant to oxygen and sulfur dioxide and a method of preparing the same, more particularly to an amine-based carbon dioxide adsorbent including a chelating agent which has improved oxidation resistance by further introducing a chelating agent in the process of synthesizing a carbon dioxide adsorbent to immobilize amine on a porous support or impregnate amine therein, a method of preparing the same, an amine-based carbon dioxide adsorbent that has resistance to sulfur dioxide by introducing a tertiary amine-rich sulfur dioxide-resistant layer and a method of preparing the same.

BACKGROUND ART

Techniques for selectively collecting carbon dioxide from flue gas in thermal power plants include wet absorption, dry adsorption, membrane separation and cryogenics. Of these, wet absorption using an aqueous solution of monoethanolamine (MEA) is the most widely used and technically complete method. In accordance with this method, carbon dioxide in the flue gas is absorbed by reacting with the MEA aqueous solution diluted to 30% or less and then the solution is heated to separate a high concentration of carbon dioxide and regenerate the MEA. This wet absorption method is an aqueous solution-based process and thus has advantages of easy heat exchange and high carbon dioxide selectivity due to strong adsorption heat of amine. However, this method requires a large amount of energy for the regeneration process of the aqueous amine solution and has disadvantages such as loss by evaporation of small amine molecules and corrosion of equipment. In addition, this method is a very uneconomic technology in this point since cost and scale-up problems are very sensitive in the industrial sites where large-scale treatment of greenhouse gases is required. For this reason, amine-based dry adsorbents having high carbon dioxide selectivity while requiring less energy to regenerate the adsorbents are emerging as a new alternative.

Amine-based dry adsorbents absorb carbon dioxide through strong chemical bonding between carbon dioxide and amine, like wet adsorption using an aqueous amine solution. Adsorption capacity of such a dry adsorbent can be maximized by increasing the amount of amine supported using supports having high carbon dioxide selectivity and high porosity. As a representative example thereof, research results have been reported that the adsorption capacity of carbon dioxide can be dramatically improved by supporting an amine polymer as much as possible in a silica support having a very large pore volume (Zhang, H. et al., RSC Adv. 4, 2014, 19403-19417). A great deal of studies on such amine-based dry adsorbents has been focused on maximizing carbon dioxide adsorption performance by effectively carrying the maximum amine polymer through structural control of amine supports. However, in order to operate adsorbents for a long period of time in an actual process, it is necessary to additionally consider not only maximization of adsorption performance but also regeneration stability of the adsorbent, but studies on the regeneration stability are insufficient.

In fact, amine-based adsorbents are inactivated by various gases present in the flue gas. When the hydrothermal stability of the amine support is low, the performance of the adsorbents decreases due to structural deformation of the support when exposed to steam at a high temperature. In addition, it is known that, when the amine is exposed to high-temperature dried carbon dioxide during the regeneration process, it is rapidly inactivated due to production of urea and is also seriously inactivated by acid gas such as oxygen or sulfur dioxide. Fortunately, solutions to most of the inactivation problems, except for the inactivation problem by acid gases, have recently been successfully suggested through the improvement of adsorbents by researchers from Korea and other countries. For example, the problem of urea production caused by reaction with carbon dioxide at high temperatures could be solved by applying an amine having a secondary amine structure to the adsorbent (Sayari, A. et al., Langmuir 28, 4241 (2012); Choi, W. et al., Nature Communications 7, 12640 (2016)), and the structural collapse of the support by steam could be solved by using a metal oxide having a very high hydrothermal stability as a support (Jones, C. W. et al., Applied Materials & Interfaces 2, 3363 (2010); Min, K. et al., ChemSusChem 10, 2518 (2017)). Unfortunately, however, problems associated with inactivity due to acidic gases such as oxygen and sulfur dioxide remain unsolved as a major hurdle to commercialization.

As mentioned above, the presence of oxygen which causes oxidative decomposition of amine at high temperatures is a major cause of rapid decrease in the stability of amine-based solid adsorbents during the continuous adsorption/desorption process. In an attempt to solve this phenomenon, relatively limited studies have been conducted to address the problem of amine oxidation. For example, research results were reported by Chuang and his colleagues at Akron University that the addition of polyethylene glycol (PEG) to silica adsorbents, in which polyethyleneimine is supported, can inhibit the oxidative degradation of amines through hydrogen bonding between amines and hydroxyl groups in the PEG molecule (Chuang, S. S. C. et al., ChemSusChem 5, 1435 (2012)). C. W. Jones group at Georgia Tech. reported research results that an adsorbent in which polypropyleneimine is supported rather than polyethyleneimine exhibits improved oxidation resistance as the distance between the amine groups increases (Jones, C. W. et al., Journal of the American Chemical Society 139, 3627 (2017)). However, such related art has a limitation in that the oxidative decomposition of amines cannot be remarkably improved to the level which is necessary for commercialization of adsorbents.

As described above, the oxidation resistance of solid amine adsorbents has not been actively studied. However, studies have been actively conducted to improve the oxidation resistance of aqueous amine solutions in case of a wet absorption method having a relatively long history of the technology. In case of wet adsorbents using MEA solutions, studies have been conducted on the introduction of various oxidation inhibitors to inhibit oxidative decomposition of amines (Rochelle, G. T. et al., Industrial & Engineering Chemistry Research 53, 16222 (2014)). Scavengers that directly remove radicals and activated oxygen, and chelating agents that can remove metal ions (Fe, Cu) functioning to catalyze radical formation with complex compounds have been studied as antioxidants. Most of these antioxidants have been found to have positive effects, but there are limitations on requiring continuous injection of antioxidants, since oxygen is continuously introduced under adsorption conditions and metal ions are continuously leached by corrosion in the reactor.

Since amine-based solid adsorbents have no reactor corrosion problem, the effects of metal impurities facilitating amine oxidation have been neglected. However, the present inventors have found that metal impurities are present in ppm in various amine compounds, and that the oxidation resistance of amines can be remarkably improved by forming complexes from these impurities as chelating agents.

Generally, the flue gas generated during the post-combustion collection process contains about 2,000 ppm of sulfur dioxide. The FGD process used to remove such a high concentration of sulfur dioxide includes wet FGD, semidry FGD, dry FGD, ammonium FGD and the like. Of these, the FGD process, which is the most widely used due to economic efficiency and high desulfurization efficiency, is a wet-limestone FGD process using limestone {Srivastava, R. K., Jozewicz, W., "Flue Gas Desulfurization: The State of the Art", J. Air Waste Manag. Assoc. 51, 1676-1688(2001)}. Since a general wet-limestone FGD process has a desulfurization efficiency of about 90%, the concentration of sulfur dioxide after the FGD process is about 200 ppm. However, in order for the amine-based adsorbent to operate for a longer period of time, it is preferable that the sulfur dioxide concentration is further decreased to several tens of ppm and, for this purpose, additional desulfurization facilities such as sulfur dioxide filters are required. Therefore, for the process design in consideration of economic efficiency, there is a need to develop carbon dioxide adsorbents having resistance against inactivation by sulfur dioxide. The present inventors completed the present invention based on the finding that resistance to sulfur dioxide can be remarkably improved by introducing a tertiary amine-rich sulfur dioxide-resistant layer in the edge so that the adsorption selectivity for carbon dioxide is excellent and the regeneration stability is excellent in the process including sulfur dioxide.

DISCLOSURE OF INVENTION

Therefore, the present invention has been made in view of the above problems, and it is one object of the present invention to provide an amine-based carbon dioxide adsorbent with improved oxidation resistance and a method of preparing the same.

It is another object of the present invention to provide an amine-based carbon dioxide adsorbent with improved resistance to sulfur dioxide and a method of preparing the same.

It is yet another object of the present invention to provide a method of adsorbing carbon dioxide using the adsorbent.

In accordance with the present invention, the above and other objects can be accomplished by the provision of an amine-based carbon dioxide adsorbent comprising a chelating agent that includes an amine compound and a porous support serving as a structural support for the amine compound, and further includes a chelating agent to inhibit oxidative decomposition of amine.

In accordance with another aspect of the present invention, provided is a method of preparing the amine-based carbon dioxide adsorbent comprising: (a) supporting the chelating agent on the porous support by adding a porous support to a solution in which a chelating agent is dissolved in a solvent; (b) obtaining a support supporting the chelating agent by removing the solvent to; (c) immobilizing the amine compound on the support by adding the support supporting the chelating agent of the step (b) to a solution in which an amine compound is dissolved in a solvent; and (d) removing the solvent of step (c).

In accordance with another aspect of the present invention, provided is carbon dioxide adsorbent having a core-shell structure comprising: a core containing an amine compound and a porous support; and a shell containing a sulfur dioxide-resistant amine compound and being coated with surrounding the core.

In accordance with another aspect of the present invention, provided is a method of preparing the carbon dioxide adsorbent having a core-shell structure comprising: (a) immobilizing an amine compound on a porous support; (b) adding a solution prepared by dissolving epoxide in a solvent to the amine compound immobilized on the support; (c) forming a sulfur dioxide-resistant amine layer by reacting the amine compound immobilized on the support with epoxide; and (d) obtaining a carbon dioxide adsorbent containing the sulfur dioxide-resistant amine layer by removing the solvent.

In accordance with yet another aspect of the present invention, provided is a method of adsorbing carbon dioxide using the adsorbent.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which:

FIG. 1 is a table showing molecular structures of chelating agents according to one Preparation Example of the present invention;

BEST MODE FOR CARRYING OUT THE INVENTION

Unless defined otherwise, all technical and scientific terms used herein have the same meaning as those appreciated by those skilled in the field to which the present invention pertains. In general, nomenclature used herein is well-known in the art and is ordinarily used.

The present invention can be completely accomplished by the following description. It should be understood that the following description is provided only for illustration of preferred embodiments of the invention and should not be construed as limiting the scope of the present invention. In addition, it should be understood that the accompanying drawings are provided for further understanding of the invention and should not be construed as limiting the scope of the present invention and that the details of the individual configurations can be suitably understood by the concrete purpose of the related description to be described later.

The present inventors found that metal impurities were present in ppm-scale various amine compounds as well, that the oxidation resistance of amines could be dramatically improved by forming complex compounds from these impurities as chelating agents, and that the amine-based carbon dioxide adsorbent including a variety of chelating agents produced based on this point had high oxidation resistance during a carbon dioxide collection process after combustion.

Figure 2:
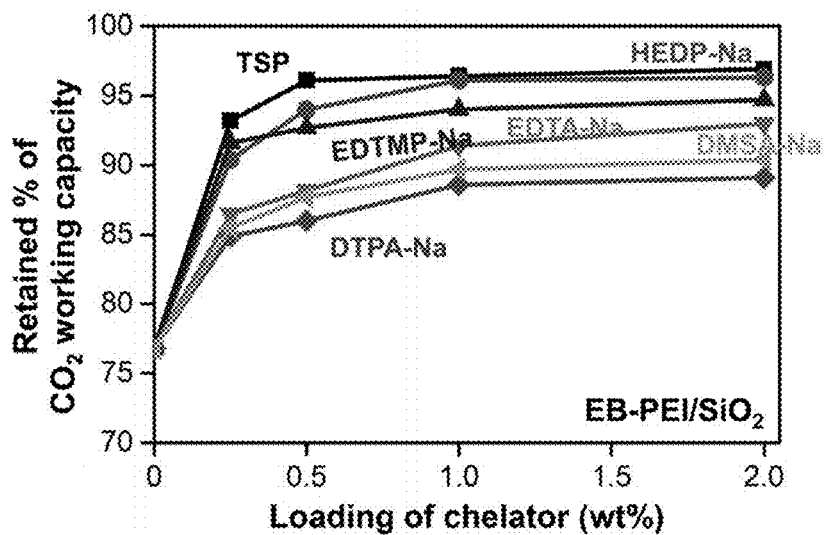
FIG. 2 is a graph showing the ratio of adsorption capability after oxidative treatment with respect to the initial adsorption capability, when oxidatively treating amine-based carbon dioxide adsorbents containing a chelating agent prepared in one Preparation Example with the gas having the composition of [3% $O_2$, $N_2$ balance] at 110° C. for 24 hours.
Figure 3:
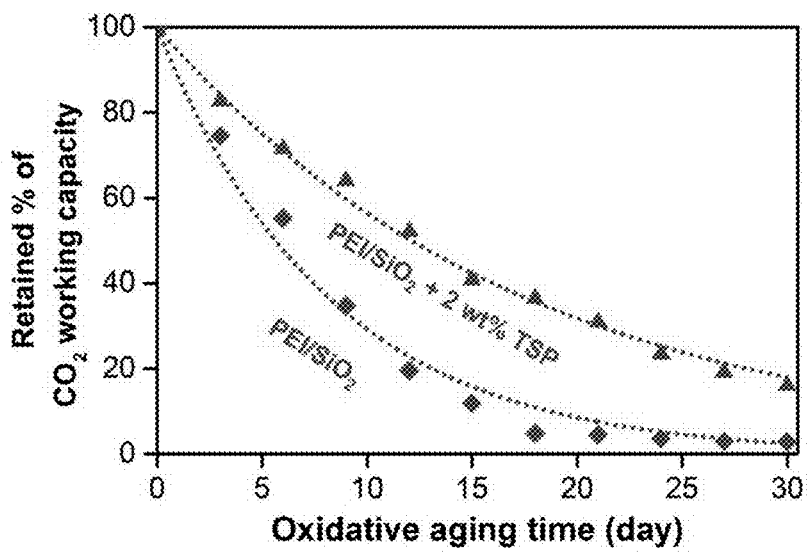
FIG. 3 is a graph showing comparison of variation in the ratio of adsorption capability after oxidative treatment with respect to the initial adsorption capability, when oxidatively treating "PEI/$SiO_2$+TSP2 wt %", the adsorbent, on which trisodium phosphate (TSP) and a polyethylenimine amine polymer are supported, prepared in one Preparation Example, and "PEI/$SiO_2$", the adsorbent on which only the polyethylenimine amine polymer is supported without trisodium phosphate (TSP), with the gas having the composition of [15% $CO_2$, 10% $H_2O$, 3% $O_2$, $N_2$ balance] at 110° C. for 30 days.
Figure 4:
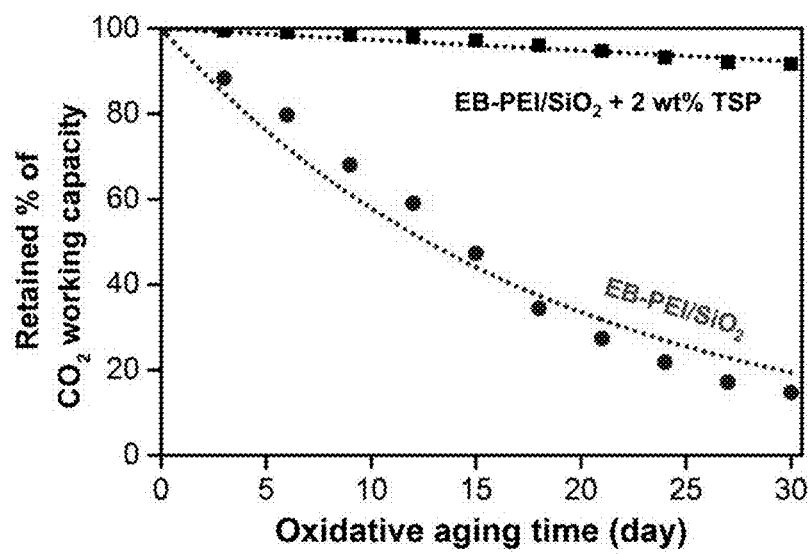
FIG. 4 is a graph showing comparison of variation in the ratio of adsorption capability after oxidative treatment with respect to the initial adsorption capability, when oxidatively treating "EB-PEI/$SiO_2$+TSP2 wt %", the adsorbent, on which trisodium phosphate (TSP) and a modified polyethylenimine amine polymer are supported, prepared in one Preparation Example, and "EB-PEI/$SiO_2$", the adsorbent, on which only the modified polyethylenimine amine polymer is supported without trisodium phosphate (TSP), with the gas having the composition of [15% $CO_2$, 10% $H_2O$, 3% $O_2$, $N_2$ balance] at 110° C. for 30 days.

In one embodiment of the present invention, it was found that the amine-based carbon dioxide adsorbent containing a chelating agent has excellent stability although it is treated with a gas having the composition of 15% $CO_2$, 10% $H_2O$, 3% $O_2$ and $N_2$ balance, which is very similar to the composition of flue gas, at a high temperature of 110° C. for 30 days, and that it was experimentally identified that such high oxidation stability is due to the fact that the oxidative decomposition of the amine does not occur even in the presence of oxygen owing to the chelating agent present in the adsorbent, when the adsorbent is used for the carbon dioxide collection process (FIGS. 2 to 4).

Thus, in a further aspect, the present invention is directed to an amine-based carbon dioxide adsorbent including an amine compound, a porous support and a chelating agent.

In another aspect, the present invention is directed to a method of preparing an amine-based carbon dioxide adsorbent including (a) adding a porous support to a solution in which a chelating agent is dissolved in a solvent to support the chelating agent on the porous support, (b) removing the solvent to obtain a support supporting the chelating agent, (c) adding the support supporting the chelating agent of step (b) to a solution obtained by dissolving an amine compound in a solvent to immobilize the amine compound on the support, and (d) removing the solvent of step (c).

In the present invention, the chelating agent is used to improve the oxidation resistance by suppressing the oxidative decomposition of amines. The chelating agent includes any compound that can form a chelate, which is a complex ion created by coordination bonding at two or more positions between one ligand and a metal ion. The chelating agent may include, but is not limited to, phosphoric acid and salts in which some or all of the hydrogen cations (protons) thereof are substituted with alkali metal cations (for example, sodium phosphate), etidronic acid (1-hydroxyethane 1,1-diphosphonic acid, HEDP) and salts in which some or all of the hydrogen cations thereof are substituted with alkali metal cations (for example, HEDP-Na), ethylenediamine tetramethylene phosphonic acid (EDTMP) and salts in which some or all of the hydrogen cations thereof are substituted with alkali metal cations (for example, EDTMP-Na), ethylenediaminetetraacetic acid (EDTA) and salts in which some or all of the hydrogen cations thereof are substituted with alkali metal cations (for example, EDTA-Na), pentetic acid (diethylenetriaminepentaacetic acid, DTPA) and salts in which some or all of the hydrogen cations thereof are substituted with alkali metal cations (for example, DTPA-Na), dimercaptosuccinic acid (DMSA) and salts in which some or all of the hydrogen cations thereof are substituted with alkali metal cations (for example, DMSA-Na), aminotris(methylenephosphonic acid) and salts in which some or all of the hydrogen cations thereof are substituted with alkali metal cations, diethylenetriamine pentamethylene phosphonic acid (DTPMP) and salts in which some or all of the hydrogen cations thereof are substituted with alkali metal cations, disodium tetrasulfide and the like.

In the present invention, the chelating agent may be present in an amount of 0.01 to 30% by weight, preferably 0.1 to 5% by weight, with respect to the total weight of the adsorbent. When the chelating agent is present in an amount of less than 0.01% by weight, oxidation resistance can be effectively improved and, when the chelating agent is present in an amount of higher than 30% by weight, carbon dioxide cannot be effectively adsorbed due to reduced weight of amine.

In the present invention, the amine compound may include a unit skeletal structure represented by Formula 1 and Formula 2, and in the unit skeletal structure, R may be hydrogen or a branched chain:

$$—[(CH_2)_x—NR]_y—$$ [Formula 1]

wherein R is hydrogen or a branched chain, x is an integer of 2 to 6 and y is an integer of 1 to 100; and

$$—[(CH_2)_x—NH_2]$$ [Formula 2]

wherein R is hydrogen or a branched chain and x is an integer of 2 to 6.

Preferably, the amine compound may include polyalkyleneimine such as a polyethylenimine basic structure (in case of x=2) or a polypropylenimine basic structure (in case of x=3).

In the present invention, the amine compound may include amino-silane selected from the group consisting of polyalkyleneimine such as polyethylenimine or polypropylenimine, 3-aminopropyl-trimethoxysilane, trimethoxy(3-methylaminopropylsilane), N, N-dimethylaminopropyl trimethoxysilane and N-(3-trimethoxysilylpropyl)diethylenetriamine. In addition, the amine compound may include a compound represented by Formula 3 wherein at least one of the nitrogen atoms in a polyalkyleneimine polymer is modified with a hydroxyl group-containing carbon chain:

—(CH$_2$)$_m$(OH)$_n$X    [Formula 3]

wherein m is an integer of 1 to 20, n is an integer of 1 to 10, and X is selected from the group consisting of hydrogen, C1 to C18 alkyl, C3 to C10 cycloalkyl, C1 to C18 alkoxy, —CH=CH$_2$, —CH=CHCH$_2$CH$_3$, —CH$_2$CH=CHCH$_3$, —CH$_2$CH$_2$CH=CH$_2$, —CH=CHCH$_2$CH$_2$CH$_3$, —CH$_2$CH=CHCH$_2$CH$_3$, —CH$_2$CH$_2$CH=CHCH$_3$, —CH$_2$CH$_2$CH$_2$CH=CH$_2$, —CH=CHCH$_2$CH$_2$CH$_2$CH$_2$CH$_3$, —CH$_2$CH=CHCH$_2$CH$_2$CH$_2$CH$_3$, —CH$_2$CH$_2$CH=CHCH$_2$CH$_2$CH$_3$, —CH$_2$CH$_2$CH$_2$CH=CHCH$_2$CH$_3$, —CH$_2$CH$_2$CH$_2$CH$_2$CH=CHCH$_3$, —CH$_2$CH$_2$CH$_2$CH$_2$CH$_2$CH=CHCH$_3$, —CH$_2$CH$_2$CH$_2$CH$_2$CH$_2$CH$_2$CH=CH$_2$, —CH$_2$O(CH$_2$)$_3$Si(OCH$_3$)$_3$, —CH$_2$O(CH$_2$)$_3$Si(OCH$_2$OH$_3$)$_3$, —CH$_2$O(CH$_2$)$_2$CH$_3$, —CH$_2$O(CH$_2$)$_3$CH$_3$, —CH$_2$OCH=CHCH$_3$ and —CH$_2$OCH$_2$CH=CH$_2$.

In Formula 3, preferably, m is an integer of 2 to 10, n is an integer of 1 to 5, and X is C1 to C18 alkyl, more preferably, X is methyl, ethyl, propyl, butyl, pentyl or hexyl.

Taking into consideration the content ratio of nitrogen atoms in a unit molecular structure in the amine compound and inhibition of urea production, most preferred is an amine polymer wherein at least one of the nitrogen atoms in a polyalkyleneimine or a polyalkyleneimine polymer is modified with a hydroxyl group-containing carbon chain.

In the present invention, the amine compound may be present in an amount of 5 to 75% by weight, preferably 20 to 65% by weight, with respect to the total weight of the adsorbent. When the amine compound is present in an amount of less than 5% by weight, absorbent capability is considerably reduced due to decreased sites for adsorbing carbon dioxide, and, when the amine compound is present in an amount of higher than 75% by weight, porosity does not remain in the support, which makes diffusion of carbon dioxide and thus effective adsorption impossible.

In the present invention, the amine compound and the chelating agent are supported on the porous support. The porous support serves as a structural support for the amine compound. The amine compound can be supported by grafting using a functional group such as a surface hydroxyl group of the support or by impregnation in the pores of the support.

In the present invention, the porous support may be selected from the group consisting of silica, alumina, activated carbon, zeolite, and metal-organic frameworks (MOFs), preferably silica.

The porous support may have a porosity of 0.1 to 5 cc/g. The reason for this is that, when the porosity of the porous support is less than 0.1 cc, a sufficient area to support amine or the chelating agent cannot be secured and, when the porosity of the porous support is higher than 5 cc, it does not fall into the practically applicable range.

In the present invention, the porous support may be present in an amount of 25 to 95% by weight, preferably 35 to 80% by weight, with respect to the total weight of the adsorbent. When the content of the porous support is lower than 25% by weight, there is no porosity left in the support after supporting amine and the chelating agent, which makes diffusion of carbon dioxide and thus effective adsorption impossible, and when the content of the porous support is higher than 95% by weight, absorbent capability is considerably reduced due to decreased sites for adsorbing carbon dioxide.

In the present invention, the solvent may be selected from the group consisting of water, methanol, ethanol, acetone, acetonitrile, methyl chloride, carbon tetrachloride, hexane, cyclohexane, benzene, toluene, and tetrahydrofuran, preferably water or methanol.

In the present invention, generally, an adsorbent can be prepared by adding a solution, in which a chelating agent is dissolved in a solvent, to a porous support, to obtain a support on which the chelating agent is supported, and then immobilizing an amine compound on the support. In some cases, however, an adsorbent can be prepared by adding a solution in which both a chelating agent and an amine compound are dissolved in a solvent to a porous support to simultaneously immobilize the chelating agent and the amine compound on the porous support, and removing the solvent.

In addition, it is found by the present invention, when an adsorbent having, as a core, a porous support, on which an amine compound is supported, and, as a shell, an amine layer resistant to inactivity by sulfur dioxide is prepared, sulfur dioxide contained in the flue gas during the carbon dioxide collection process is not irreversibly adsorbed, and thus the problem of severe inactivation can be solved, and not only carbon dioxide adsorption performance but also regeneration stability can be remarkably improved even during the process including sulfur dioxide.

Accordingly, in one aspect, the present invention is directed to a carbon dioxide adsorbent having a core-shell structure that includes a core containing an amine compound and a porous support, and a shell containing a sulfur dioxide-resistant amine compound and being coated to surround the core.

In another aspect, the present invention is directed to a method of preparing a carbon dioxide adsorbent having a core-shell structure including (a) immobilizing an amine compound on a porous support, (b) adding a solution prepared by dissolving epoxide in a solvent to the amine compound immobilized on the support, (c) reacting the amine compound immobilized on the support with epoxide to form a sulfur dioxide-resistant amine layer, and (d) removing the solvent to obtain a carbon dioxide adsorbent containing the sulfur dioxide-resistant amine layer.

In the present invention, the amine compound of the shell contains an amine compound having a hydroxyl group-containing carbon chain which has a basic skeleton unit represented by —[(CH$_2$)$_m$(OH)$_n$NX]$_y$, wherein m is an integer of 1 to 20, n is an integer of 1 to 10, and y is an integer of 1 to 100. Preferably, m is 2 to 10, n is 1 to 5, and y is 5 to 20. X is hydrogen, C1 to C18 alkyl, C3 to C10 cycloalkyl, C1 to C18 alkoxy, —CH=CH$_2$, —CH=CHCH$_2$CH$_3$, —CH$_2$CH=CHCH$_3$, —CH$_2$CH$_2$CH=CH$_2$, —CH=CHCH$_2$CH$_2$CH$_3$, —CH$_2$CH=CHCH$_2$CH$_2$CH$_3$, —CH$_2$CH$_2$CH=CHCH$_2$CH$_3$, —CH$_2$CH$_2$CH$_2$CH=CHCH$_3$, —CH$_2$CH$_2$CH$_2$CH$_2$CH=CH$_2$, —CH=CHCH$_2$CH$_2$CH$_2$CH$_2$CH$_3$, —CH$_2$CH=CHCH$_2$CH$_2$CH$_2$CH$_3$, —CH$_2$CH$_2$CH=CHCH$_2$CH$_2$CH$_3$, —CH$_2$CH$_2$CH$_2$CH=CHCH$_2$CH$_3$, —CH$_2$CH$_2$CH$_2$CH$_2$CH=CHCH$_3$, —CH$_2$CH$_2$CH$_2$CH$_2$CH$_2$CH=CHCH$_3$, —CH$_2$CH$_2$CH$_2$CH$_2$CH$_2$CH$_2$CH=CH$_2$, —CH$_2$O(CH$_2$)$_3$Si(OCH$_3$)$_3$, —CH$_2$O(CH$_2$)$_3$Si(OCH$_2$CH$_3$)$_3$, —CH$_2$O(CH$_2$)$_2$OH$_3$, —CH$_2$O(CH$_2$)$_3$CH$_3$, —CH$_2$OCH=CHCH$_3$, or —CH$_2$OCH$_2$CH=CH$_2$, preferably C1 to C18 alkyl. More particularly, examples of X include methyl, ethyl, propyl, butyl, pentyl, hexyl and the like.

In the present invention, regarding the sulfur dioxide-resistant amine layer of the shell, the proportion of nitrogen present as tertiary amine among nitrogen atoms is 50% to 100%, preferably 70% or more. When the proportion of nitrogen present as tertiary amine is lower than 50%, there occurs a problem in that inactivation is more accelerated by irreversible adsorption of sulfur dioxide into primary and secondary amines.

In the present invention, the sulfur dioxide-resistant amine layer of the shell may be present in an amount of 0.1% by weight to 30% by weight, preferably 5% by weight to 20% by weight, with respect to the total weight of the adsorbent. When the sulfur dioxide-resistant amine compound (amine layer) of the shell is present in an amount of less than 0.1% by weight, with respect to the total weight of adsorbent, the amine active material of the core cannot be protected from irreversible adsorption of sulfur dioxide due to an excessively thin shell, and when the sulfur dioxide-resistant amine compound (amine layer) of the shell is present in an amount of higher than 30% by weight, carbon dioxide adsorption capability is disadvantageously decreased due to increased total amount of adsorbent.

In the present invention, the amine compound of the core has a unit skeletal structure represented by —[(CH$_2$)$_x$—NR]$_y$— and —[(CH$_2$)$_x$—NH$_2$], wherein R is each independently hydrogen, hydrocarbon or a branched chain. Specifically, the amine compound of the core may include polyalkyleneimine such as a polyethylenimine basic structure (in case of x=2) or a polypropylenimine basic structure (in case of x=3), and the basic structure represents a repeat unit determined by the value of x of 2 to 6 and y of 1 to 100.

In the present invention, the amine compound of the core includes any compound that includes primary amine, secondary amine or tertiary amine in the molecular structure thereof. Non-limiting examples of such an amine compound include polyalkyleneimine such as polyethylenimine or polypropylenimine, amine polymers wherein at least one of nitrogen atoms in the polyalkyleneimine polymer is modified with a hydroxyl group-containing carbon chain, and amino-silane such as 3-(aminopropyl)-trimethoxysilane, trimethoxy[3-(methylamino)propyl]silane, N,N-dimethylaminopropyl)trimethoxysilane, and N-(3-Trimethoxysilylpropyl) diethylenetriamine. Taking into consideration the content ratio of nitrogen atoms in a unit molecular structure in the amine compound and inhibition of urea production, most preferred is an amine polymer wherein at least one of nitrogen atoms in polyalkyleneimine or a polyalkyleneimine polymer is modified with a hydroxy-containing carbon chain.

In the present invention, the amine compound of the core may be present in an amount of 5% by weight to 75% by weight, preferably 10% by weight to 65% by weight, with respect to the total weight of the adsorbent. When the amine compound of the core is present in an amount less than 5% by weight, with respect to the total weight of the adsorbent, the amount of adsorbed carbon dioxide is decreased to a level of less than 1%, and when the amine compound of the core is present in an amount higher than 75% by weight, an excessively great amount of amine is supported and efficiency of amine with respect to adsorption of carbon dioxide is disadvantageously decreased.

In the present invention, the amine compound of the core is immobilized on the porous support. A method of immobilizing an amine compound on a support may include grafting using a functional group such as hydroxyl group of the surface of the support or impregnation into pores of the support. At this time, the support may have a porosity of 0.1 cc/g to 5 cc/g. When the porosity of the porous support is less than 0.1 cc, sufficient carbon dioxide adsorption capability cannot be obtained due to limitation on the amount of the porous support to support or functionalize amine and, when the porosity of the porous support is higher than 5 cc/g, the porous support is inapplicable to fluidized bed reaction due to the excessively thin wall thickness of the support and thus decreased mechanical strength.

In the present invention, the porous support of the core may be present in an amount of 20% by weight to 90% by weight, preferably 30% by weight to 80% by weight, with respect to the total weight of the adsorbent. When the porous support of the core is present in an amount of less than 20% by weight, with respect to the total weight of the adsorbent, amine efficiency is decreased due to excessively great amount of supported amine and thus amine may be lost at high temperatures, and when the porous support of the core is present in an amount of higher than 90% by weight, carbon dioxide adsorption capability is disadvantageously decreased due to the excessively small content of active material, i.e., amine.

In the present invention, the molar ratio of nitrogen atom to epoxide present in the amine compound immobilized on the support is preferably 1:0.2 to 1:1. When the molar ratio is less than 1:0.2, inactivation disadvantageously occurs due to production of urea under regeneration conditions, i.e., upon exposure to high-temperature dried carbon dioxide and, when the molar ratio is higher than 1:1, carbon dioxide adsorption efficiency is disadvantageously decreased due to increased weight of the amine compound.

In the present invention, the epoxide is preferably at least one selected from the group consisting of 1,2-epoxyethane, 1,2-epoxypropane, 1,2-epoxybutene, 1,2-epoxypentane and 1,2-epoxyhexane, more preferably, 1,2-epoxybutene.

In addition, in the present invention, the adsorbent "10-EB-PEI/SiO$_2$", where a sulfur dioxide-resistant amine layer is not present, exhibited a gradual decrease in adsorption capacity as the adsorption/desorption cycle repeats, whereas the core-shell type adsorbent having, as a core, the adsorbent and having, as a shell, an amine layer with a high order through additional amine-epoxide reaction exhibited remarkably improved regeneration stability.

Accordingly, another aspect of the present invention is directed to a method of adsorbing carbon dioxide using the adsorbent.

Hereinafter, the present invention will be described in more detail with reference to examples. However, it is obvious to those skilled in the art that these examples are provided only for illustration of the present invention and should not be construed as limiting the scope of the present invention.

Preparation Example 1: Preparation of
Amine-Based Carbon Dioxide Adsorbent
Containing Chelating Agent First, a chelating agent was supported on a support in order to prepare an amine-based carbon dioxide adsorbent including a chelating agent. FIG. 1 is a table showing molecular structures of chelating agents used for the present invention.

Preparation Example 1-1: Preparation of Adsorbent Containing Trisodium Phosphate First, 0.016 g, 0.032 g, 0.064 g and 0.128 g of trisodium phosphate (TSP) were each dissolved in 0.5 g of water, followed by stirring at a constant stirring rate of 400 rpm for 10 minutes to prepare four TSP solutions. The prepared trisodium phosphate solutions were supported in pores of fumed silica by incipient wetness impregnation which is the most generally used method. Then, in order to completely remove the solvent, the supported solutions were thermally treated at 80° C. in a vacuum oven for 12 hours to prepare four TSP-supported silica.

Then, an amine solution to be supported on the trisodium phosphate-supported silica was prepared. The supported amines used herein were non-modified general polyethylenimine and polyethylenimine wherein nitrogen atoms in the polyethylenimine polymer are modified with a hydroxyl group-containing carbon chain. Synthesis of the modified polyethylenimine solution started from reaction between 1,2-epoxybutene (EB) and polyethylenimine (PEI). At 298K, 2 g of polyethylenimine (Mn: 1,200, 19 mmol N/g) was dissolved in 4 g of methanol, followed by stirring at a constant stirring rate of 400 rpm for 10 minutes. Then, 1.2 g of 1,2-epoxybutene was added to the polyethylenimine/methanol solution while stirring, such that the molar ratio of the nitrogen atom (N) present in polyethylenimine to 1,2-epoxybutene was adjusted to 0.37, followed by further stirring at a rate of 400 rpm for 12 hours, to synthesize a modified polyethylenimine/methanol solution. The non-modified general polyethylenimine solution was obtained by dissolving 2 g of polyethylenimine in 4 g of methanol and stirring the solution at a constant stirring rate of 400 rpm for 10 minutes.

Incipient wetness impregnation was conducted in order to support the modified polyethylenimine/methanol solution and the non-modified general polyethylenimine/methanol solution in pores of silica on which the trisodium phosphate is supported. Then, the solutions were thermally treated at 80° C. in a vacuum oven for 12 hours to completely remove the solvent. The adsorbents, on which modified polyethylenimines are supported, were designated by "EB-PEI/$SiO_2$+TSP0.25 wt %", "EB-PEI/$SiO_2$+TSP0.5 wt %", "EB-PEI/$SiO_2$+TSP1 wt %" and "EB-PEI/$SiO_2$+TSP2 wt %", and adsorbents, on which polyethylenimines are supported, were designated by "PEI/$SiO_2$+TSP0.25 wt %", "PEI/$SiO_2$+TSP0.5 wt %", "PEI/$SiO_2$+TSP1 wt %" and "PEI/$SiO_2$+TSP2 wt %".

Preparation Example 1-2: Preparation of Adsorbent Containing 1-Hydroxyethane 1,1-Diphosphonic Acid Tetrasodium Salt Adsorbents were prepared in the same manner as in Preparation Example 2-1 using 1-hydroxyethane 1,1-diphosphonic acid tetrasodium salt (HEDP-Na) as another chelating agent and the adsorbents, on which modified polyethylenimine and HEDP-Na were supported, were designated by "EB-PEI/$SiO_2$+HEDP-Na0.25 wt %", "EB-PEI/$SiO_2$+HEDP-Na0.5 wt %", "EB-PEI/$SiO_2$+HEDP-Na1 wt %" and "EB-PEI/$SiO_2$+HEDP-Na2 wt %".

Preparation Example 1-3: Preparation of Adsorbent Containing Ethylenediamine Tetramethylene Phosphonic Acid Octasodium Salt Adsorbents were prepared in the same manner as in Preparation Example 2-1 using ethylenediamine tetramethylene phosphonic acid octasodium salt (EDTMP-Na) as another chelating agent and the adsorbents, on which modified polyethylenimine and EDTMP-Na were supported, were designated by "EB-PEI/$SiO_2$+EDTMP-Na0.25 wt %", "EB-PEI/$SiO_2$+EDTMP-Na0.5 wt %", "EB-PEI/$SiO_2$+EDTMP-Na1 wt %" and "EB-PEI/$SiO_2$+EDTMP-Na2 wt %".

Preparation Example 1-4: Preparation of Adsorbent Containing Ethylenediaminetetraacetic Acid Tetrasodium Salt Adsorbents were prepared in the same manner as in Preparation Example 2-1 using ethylenediaminetetraacetic acid tetrasodium salt (EDTA-Na) as another chelating agent, and the adsorbents, on which modified polyethylenimine and EDTA-Na were supported, were designated by "EB-PEI/$SiO_2$+EDTA-Na0.25 wt %", "EB-PEI/$SiO_2$+EDTA-Na0.5 wt %", "EB-PEI/$SiO_2$+EDTA-Na1 wt %" and "EB-PEI/$SiO_2$+EDTA-Na2 wt %".

Preparation Example 1-5: Preparation of Adsorbent Containing Diethylenetriaminepentaacetic Acid Pentasodium Salt Adsorbents were prepared in the same manner as in Preparation Example 1 using diethylenetriaminepentaacetic acid pentasodium salt (DTPA-Na) as another chelating agent, and the adsorbents, on which modified polyethylenimine and DTPA-Na were supported, were designated by "EB-PEI/$SiO_2$+DTPA-Na0.25 wt %", "EB-PEI/$SiO_2$+DTPA-Na0.5 wt %", "EB-PEI/$SiO_2$+DTPA-Na1 wt %" and "EB-PEI/$SiO_2$+DTPA-Na2 wt %".

Preparation Example 1-6: Preparation of Adsorbent Containing Dimercaptosuccinic Acid Disodium Salt as Chelating Agent Adsorbents were prepared in the same manner as in Preparation Example 1 using dimercaptosuccinic acid disodium salt (DMSA-Na) as another chelating agent, and the adsorbents, on which modified polyethylenimine and DMSA-Na were supported, were designated by "EB-PEI/$SiO_2$+DMSA-Na0.25 wt %", "EB-PEI/$SiO_2$+DMSA-Na0.5 wt %", "EB-PEI/$SiO_2$+DMSA-Na1 wt %" and "EB-PEI/$SiO_2$+DMSA-Na2 wt %".

Example 1: Evaluation of Oxidation Resistance of Amine-Based Carbon Dioxide Adsorbent Containing Chelating Agent Oxidation resistance for amine-based carbon dioxide adsorbents containing various chelating agents prepared in Preparation Example 1 was evaluated by the following method and results are shown in FIGS. 2 to 4.

Oxidation resistance was evaluated by the ratio of adsorption capability after oxidative treatment with respect to the initial adsorption capability of the adsorbent, and adsorption capability was analyzed by thermogravimetric analysis (TGA). About 20 mg of the adsorbent was placed on a TGA fan, the adsorbent was maintained at 100° C. for one hour while feeding 100% nitrogen ($N_2$) at 50 sccm to conduct pre-treatment in order to detach gases adsorbed on the surface of the adsorbent, and then the adsorbent was maintained at 40° C. for one hour while feeding 100% $CO_2$ at 50 sccm when measuring adsorption capability.

FIG. 2 is a graph showing the ratio of adsorption capability before and after oxidative treatment measured when treating amine-based carbon dioxide adsorbents containing chelating agents prepared in Preparation Examples 1-1 to 1-6 with the gas [3% $O_2$, $N_2$ balance] similar to oxygen present in actual flue gas at 110° C. for 24 hours.

As a result, it can be seen that an amine-based carbon dioxide adsorbent containing a chelating agent has improved oxidation resistance than an amine-based carbon dioxide adsorbent containing no chelating agent, and that, as the amount of present chelate agent increases, oxidation resistance gradually increases.

FIG. 3 is a graph showing variation in the ratio of adsorption capability before and after oxidative treatment measured when treating "PEI/$SiO_2$+TSP2 wt %", the adsorbent, on which a general polyethylenimine amine polymer is supported, among polyethylenimine amine polymers containing trisodium phosphate (TSP) prepared in Preparation Example 1-1, and "PEI/$SiO_2$", the adsorbent containing no chelating agent, with the gas having the composition of [15% $CO_2$, 10% $H_2O$, 3% $O_2$, $N_2$ balance] very similar to actual flue gas at 110° C., which is a temperature very similar to that of an actual desorption tower (regeneration tower), for 30 days.

As a result, it could be seen that the PEI/$SiO_2$ adsorbent containing no chelating agent shows a rapid decrease in oxidation resistance over time, which is due to very fast oxidative decomposition of amine. PEI/$SiO_2$+TSP2 wt %, the adsorbent containing a chelating agent, has relatively high oxidation resistance, because an added chelate compound functions to directly remove transition metals that form a variety of radicals and thus decreases the speed of oxidative decomposition of amine when exposed to flue gas containing oxygen.

FIG. 4 is a graph showing variation in adsorption capability before and after oxidative treatment measured when treating "EB-PEI/$SiO_2$+TSP2 wt %", an adsorbent, on which a modified polyethylenimine amine polymer is supported, among amine-based carbon dioxide adsorbents containing trisodium phosphate (TSP) prepared in Preparation Example 1-1, and "EB-PEI/$SiO_2$", an adsorbent containing no chelating agent, with the gas having the composition of [15% $CO_2$, 10% $H_2O$, 3% $O_2$, $N_2$ balance] very similar to actual flue gas at 110° C., which is a temperature very similar to that of an actual desorption tower, for 30 days.

As a result, it could be seen that such an adsorbent has similar behavior to the adsorbent on which a non-modified general polyethylenimine is supported. EB-PEI/$SiO_2$ adsorbent containing no chelating agent exhibits a gradual decrease in oxidation resistance over time, which is due to oxidative decomposition of amine. Here, it is noted that the adsorbent, on which the modified polyethyleneimine is supported has significantly improved oxidation resistance as compared with the adsorbent on which the non-modified polyethyleneimine is supported. This may be considered to be due to the hydroxyl group-containing carbon chains formed through the modification process, because the hydroxyl groups stabilize the intermediate of the oxidative decomposition mechanism of amine. In the case of the EB-PEI/$SiO_2$+TSP2 wt % adsorbent containing a chelating agent, the chelate compound added directly removes the transition metal that forms various radicals. Therefore, even upon long-term exposure to flue gas having a composition having oxygen, oxidative decomposition of amine does not occur and thus oxidation resistance is very high for 30 days.

Preparation Example 2: Preparation of Amine-Based Carbon Dioxide Adsorbent Having Core-Shell Structure Production of the amine-based carbon dioxide adsorbent having a core-shell structure started from supporting an amine compound on a porous support. The porous support used herein was fumed silica and the amine compound used herein was an amine polymer wherein nitrogen atoms in the polyethylenimine (PEI) polymer are modified with a hydroxyl group-containing carbon chain. Synthesis of the modified polyethylenimine was carried out by reaction between 1,2-epoxybutene (EB) and polyethylenimine. First, 2 g of polyethylenimine (Mn=1,200, 19 mmol N/g) was dissolved in 4 g of methanol at 25° C. and then the resulting solution was stirred at a constant rate of 400 rpm for 10 minutes. Then, 1.2 g of 1,2-epoxybutene was added to the stirred polyethylenimine/methanol solution, such that the molar ratio of polyethylenimine to 1,2-epoxybutene was adjusted to 10, followed by further stirring at a rate of 400 rpm for 12 hours, to synthesize a modified polyethylenimine/methanol solution. The modified polyethylenimine/methanol solution was supported in pores of fumed silica using incipient wetness impregnation. Then, the supported solution was thermally treated at 80° C. in a vacuum oven for 12 hours in order to completely remove the solvent. The silica adsorbent supporting the modified polyethylenimine prepared by the method was designated by "10-EB-PEI/$SiO_2$".

In order to form a shell including a sulfur dioxide-resistant amine layer on the surface of the "10-EB-PEI/$SiO_2$" adsorbent, additional amine-epoxide reaction was conducted. First, 0.08 g of 1,2-epoxybutene was dissolved in 1.6 mL of hexane to prepare a 1,2-epoxybutene solution. The 1,2-epoxybutene solution was supported on 4 g of 10-EB-PEI/$SiO_2$, followed by sealing, thermally treating at 60° C. for 24 hours and conducting amine-epoxide reaction. Then, in order to completely remove the solvent, the supported solution was thermally treated at 80° C. in a vacuum oven for 12 hours to prepare an adsorbent having a core-shell structure. The adsorbent of the core-shell structure prepared by the method was designated by "10-1-EB-PEI/$SiO_2$".

An adsorbent having a core-shell structure was prepared in the same manner as above, except that, in the preparation of "10-1-EB-PEI/$SiO_2$", 0.12 g of 1,2-epoxybutene was dissolved in 1.6 mL of hexane to prepare a 1,2-epoxybutene solution. The adsorbent of the core-shell structure prepared by the method was designated by "10-1.5-EB-PEI/$SiO_2$".

An adsorbent having a core-shell structure was prepared in the same manner as above, except that, in the preparation of "10-1-EB-PEI/$SiO_2$", 0.16 g of 1,2-epoxybutene was dissolved in 1.6 mL of hexane to prepare a 1,2-epoxybutene solution. The adsorbent of the core-shell structure prepared by the method was designated by "10-2-EB-PEI/$SiO_2$".

Example 2: Analysis of Physical/Chemical Properties of Amine-Based Carbon Dioxide Adsorbent Having Core-Shell Structure The physical/chemical properties of the amine-based carbon dioxide adsorbent having a core-shell structure prepared in Preparation Example 2 were analyzed by the following method and are described in detail with reference to FIG. 7.

Figures 6, 7:
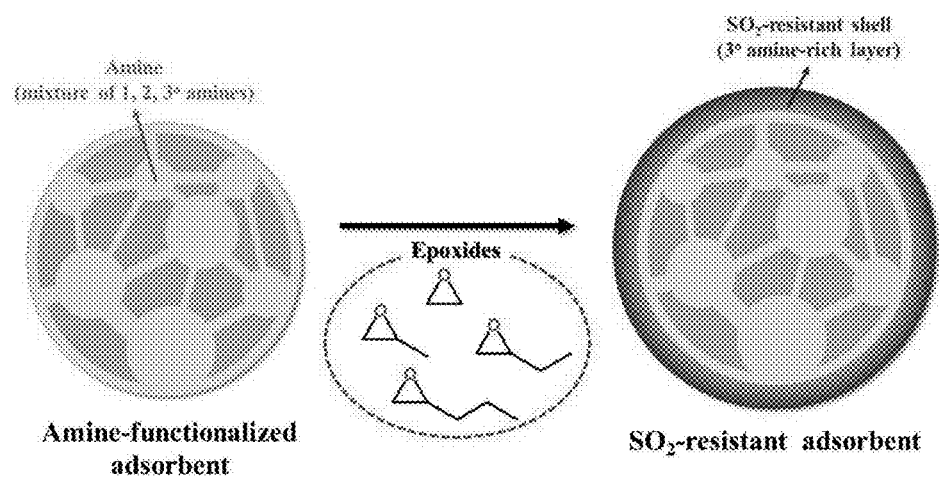
FIG. 6 is a schematic view showing a process of forming a sulfur dioxide-resistant amine layer by treating the amine-immobilized porous support according to one embodiment of the present invention with epoxide.
FIG. 7 shows results of analysis using elemental analysis (EA) and X-ray photoelectron spectroscopy (XPS) regarding an amine composition of an adsorbent according to one embodiment of the present invention.

First, elemental analysis (EA) and X-ray photoelectron spectroscopy (XPS) were used to analyze the composition of amine compound immobilized on the adsorbent prepared in Preparation Example 2. Before each analysis, all the adsorbents were thermally treated at 100° C. in a vacuum oven for 12 hours. FIG. 7 shows carbon (C)/nitrogen (N) molar ratios of amine compounds obtained from amine-based carbon dioxide adsorbents by elemental analysis and X-ray photoelectron spectroscopy. The results showed that, as the amount of used epoxide increases, the number of hydroxyalkyl groups averagely functionalized in one amine increases. Therefore, elemental analysis and X-ray photoelectron spectroscopy (XPS) results showed that the C/N ratio increases. In addition, it can be seen that, regarding adsorbents produced as the core-shell type, the C/N ratio obtained by X-ray photoelectron spectroscopy was higher than the C/N ratio obtained by elemental analysis. This is because, unlike elemental analysis to analyze the amine compound distributed over the adsorbent, X-ray photoelectron spectroscopy is used to selectively analyze the amine compound near the surface of the adsorbent. From this, it can be seen that a shell including an amine compound having a higher order than the amine compound of the core is present.

Figure 8:
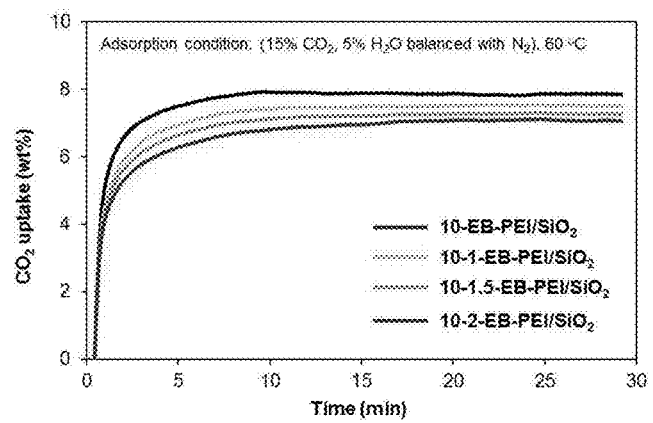
FIG. 8 shows results of analysis regarding carbon dioxide adsorption of the adsorbent according to one embodiment of the present invention.

Example 3: Evaluation of Carbon Dioxide Adsorption Capability of Amine-Based Carbon Dioxide Adsorbent Having Core-Shell Structure and Regeneration Stability Thereof Under Temperature-Swing Adsorption Conditions Containing Sulfur Dioxide The measurement of carbon dioxide adsorption capability of the adsorbent prepared in Preparation Example 2 and the evaluation of regeneration stability thereof were conducted by the following method and are described in more detail with reference to FIGS. 8 and 9.

Figure 5:
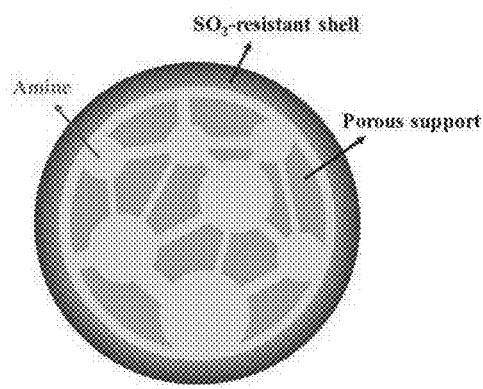
FIG. 5 is a sectional view showing an amine-based carbon dioxide adsorbent having a core-shell structure according to one embodiment of the present invention.

FIG. 5 is a graph showing carbon dioxide adsorption of the adsorbent prepared in Example 1 over time measured using an automated catalyst characterization system (Autochem 2920, Micromeritics) provided with a moisture trap and a thermal conductivity detector (TCD) at 60° C. under the conditions of 15% $CO_2$, 5% $H_2O$ and 80% $N_2$. As the amount of epoxide used to modify the amine compound increases, the mean order (size) of amine increases and thus adsorption performance gradually decreases. For this reason, to find an optimal adsorbent that has high adsorption capability and excellent regeneration stability, it is important to form a shell having a suitable thickness using minimal epoxide.

Figure 9:
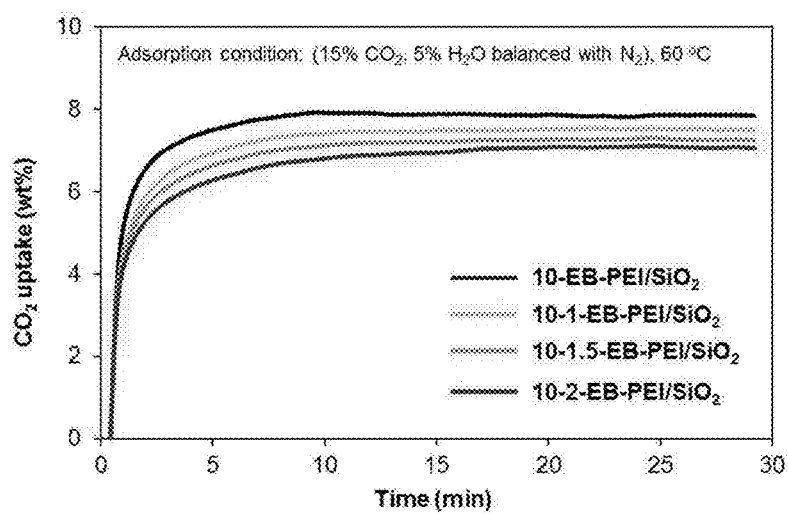
FIG. 9 shows results of analysis at an interval of 10 cycles regarding carbon dioxide adsorption performance of the adsorbent according to one embodiment of the present invention.

FIG. 9 is a graph showing carbon dioxide adsorption performance every 10 cycles in temperature-swing adsorption tests containing sulfur dioxide regarding the adsorbent prepared in Example 2 under conditions similar to actual process conditions. Adsorption/desorption conditions are given below:

Adsorption conditions: 60° C./15% $CO_2$, 5% $H_2O$, 400 ppm $SO_2$ balanced with $N_2$ Desorption conditions: 110° C./100% $CO_2$ It can be seen that the "10-EB-PEI/$SiO_2$" adsorbent having no sulfur dioxide-resistant amine layer shows a gradual decrease in adsorption capability, as adsorption/desorption cycle repeats. The reason for this is that, during adsorption, sulfur dioxide present in the gas is irreversibly adsorbed on the amine compound, thus causing inactivation. However, the core-shell type adsorbent that has the adsorbent as a core and an amine layer having a higher order (size) as a shell through additional amine-epoxide reaction has remarkably improved regeneration stability. This is due to high resistance to sulfur dioxide of tertiary amine and, during adsorption, the shell rich in tertiary amine selectively absorbs sulfur dioxide in the gas, thus protecting the amine compound of the core and, during desorption, sulfur dioxide is effectively desorbed from the shell, which is used to collect sulfur dioxide in the next adsorption step. "10-1-EB-PEI/$SiO_2$", which has a lower amount of epoxide used to form the shell of the core-shell type adsorbent, does not effectively protect the amine compound of the core from irreversible adsorption of sulfur dioxide and thus has slight deteriorated regeneration stability, whereas "10-1.5-EB-PEI/$SiO_2$" and "10-2-EB-PEI/$SiO_2$" adsorbents containing a greater amount of epoxide exhibit considerably high regeneration stability. Accordingly, "10-1.5-EB-PEI/$SiO_2$" is an optimal adsorbent having excellent regeneration stability and adsorption capability.

INDUSTRIAL APPLICABILITY

The amine-based carbon dioxide adsorbent according to the present invention exhibits considerably high oxidation resistance because an added chelate compound functions to directly remove a variety of transition metal impurities catalytically acting on amine oxidation.

In addition, the core-shell type amine-based carbon dioxide adsorbent having resistance to sulfur dioxide according to the present invention is an adsorbent that has, as a core, an amine compound-immobilized porous support and has, as a shell, an amine layer resistant to inactivity by sulfur dioxide, and a general amine-based carbon dioxide adsorbent containing no sulfur dioxide-resistant amine layer undergoes serious inactivation due to irreversible adsorption of sulfur dioxide present in the flue gas on amine during carbon dioxide collection. On the other hand, in case of the amine-based carbon dioxide adsorbent having a core-shell structure containing a sulfur dioxide-resistant amine layer, the sulfur dioxide-resistant amine layer of the shell selectively adsorbs sulfur dioxide to protect the amine compound of the core and, at the same time, the amine compound of the core selectively adsorbs only carbon dioxide. In addition, sulfur dioxide adsorbed on the shell is readily desorbed therefrom at about 110° C. and thus remarkably improved regeneration stability is obtained during the temperature-swing adsorption (TSA) process containing sulfur dioxide.

Although specific configurations of the present invention has been described in detail, those skilled in the art will appreciate that this description is provided as preferred embodiments for illustrative purposes and should not be construed as limiting the scope of the present invention. Therefore, the substantial scope of the present invention is defined by the accompanying claims and equivalents thereto.

What is claimed is:

1. An amine-based carbon dioxide adsorbent in which a chelating agent is supported on a porous support and an amine compound is bonded to the porous support,
   wherein the chelating agent is selected from the group consisting of
   phosphoric acid and salts in which some or all of the hydrogen cations (protons) thereof are substituted with alkali metal cations,
   etidronic acid (1-hydroxyethane 1,1-diphosphonic acid, HEDP) and salts in which some or all of the hydrogen cations thereof are substituted with alkali metal cations, ethylenediamine tetramethylene phosphonic acid (EDTMP) and salts in which some or all of the hydrogen cations thereof are substituted with alkali metal cations, pentetic acid (diethylenetriaminepentaacetic acid, DTPA) and salts in which some or all of the hydrogen cations thereof are substituted with alkali metal cations, dimercaptosuccinic acid (DMSA) and salts in which some or all of the hydrogen cations thereof are substituted with alkali metal cations, aminotris(methylenephosphonic acid) and salts in which some or all of the hydrogen cations thereof are substituted with alkali metal cations, diethylenetriamine pentamethylene phosphonic acid (DTPMP) and salts in which some or all of the hydrogen cations thereof are substituted with alkali metal cations, and disodium tetrasulfide.

2. The amine-based carbon dioxide adsorbent according to claim 1, wherein the chelating agent is present in an amount of 0.01 to 30% by weight, with respect to the total weight of the adsorbent.

3. The amine-based carbon dioxide adsorbent according to claim 1, wherein the amine compound comprises a unit skeletal structure represented by Formula 2 and Formula 3:

$$-[(CH_2)_x-NR]_y-$$ [Formula 2]

wherein R is hydrogen or a branched chain, x is an integer of 2 to 6 and y is an integer of 1 to 100; and $$-[(CH_2)_x-NH_2]$$ [Formula 3]

wherein x is an integer of 2 to 6.

4. The amine-based carbon dioxide adsorbent according to claim 1, wherein the amine compound is amino-silane selected from the group consisting of polyalkyleneimine including polyethylenimine or polypropylenimine; 3-aminopropyl-trimethoxysilane, trimethoxy(3-methylaminopropyl-silane), N,N-dimethylaminopropyl trimethoxysilane and N-(3-trimethoxysilylpropyl)diethylenetriamine.

5. The amine-based carbon dioxide adsorbent according to claim 1, wherein the amine compound is present in an amount of 5 to 75% by weight, with respect to the total weight of the adsorbent.

6. The amine-based carbon dioxide adsorbent according to claim 1, wherein the porous support is selected from the group consisting of silica, alumina, activated carbon and zeolite.

7. The amine-based carbon dioxide adsorbent according to claim 1, wherein the porous support has a porosity of 0.1 to 5 cc/g.

8. The amine-based carbon dioxide adsorbent according to claim 1, wherein the porous support is present in an amount of 25 to 95% by weight, with respect to the total weight of the adsorbent.

9. A method of preparing the amine-based carbon dioxide adsorbent of claim 1 comprising:
(a) supporting the chelating agent on the porous support by adding a porous support to a solution in which a chelating agent is dissolved in a solvent;
(b) obtaining a support supporting the chelating agent by removing the solvent;
(c) immobilizing the amine compound on the support by adding the support supporting the chelating agent of the step (b) to a solution in which an amine compound is dissolved in a solvent; and
(d) removing the solvent of step (c).

10. A method of adsorbing carbon dioxide using the adsorbent of claim 1, comprising contacting the adsorbent with a $CO_2$-comprising gas.

* * * * *